United States Patent
Tian et al.

(10) Patent No.: US 10,455,627 B2
(45) Date of Patent: Oct. 22, 2019

(54) DATA TRANSMISSION LINK ESTABLISHMENT APPARATUS AND METHOD, AND COMMUNICATIONS SYSTEM

(71) Applicant: Huawei Technologies Co., Ltd., Shenzhen, Guangdong (CN)

(72) Inventors: Chunchang Tian, Beijing (CN); Yong Wu, Beijing (CN); Yinghui Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/454,392

(22) Filed: Mar. 9, 2017

(65) Prior Publication Data
US 2017/0188400 A1     Jun. 29, 2017

Related U.S. Application Data (63) Continuation of application No. PCT/CN2014/086206, filed on Sep. 10, 2014.

(51) Int. Cl.
| | |
|---|---|
| *H04W 76/10* | (2018.01) |
| *H04W 76/12* | (2018.01) |
| *H04W 72/04* | (2009.01) |
| *H04W 74/00* | (2009.01) |
| *H04W 28/08* | (2009.01) |

(Continued)

(52) U.S. Cl.
CPC .......... *H04W 76/12* (2018.02); *H04W 28/08* (2013.01); *H04W 72/0433* (2013.01); *H04W 74/00* (2013.01); *H04W 28/10* (2013.01); *H04W 56/002* (2013.01); *H04W 80/00* (2013.01); *H04W 84/047* (2013.01); *H04W 92/045* (2013.01)

(58) Field of Classification Search
CPC .... H04W 76/022; H04W 80/00; H04W 76/12
USPC ........................................................ 370/329
See application file for complete search history.

(56) References Cited

U.S. PATENT DOCUMENTS

| 9,380,637 B2 | 6/2016 | Huang |
| 2007/0217373 A1 | 9/2007 | Kotzin et al. |

(Continued)

FOREIGN PATENT DOCUMENTS

| CN | 101998657 A | 3/2011 |
| CN | 102149146 A | 8/2011 |

(Continued)

*Primary Examiner* — Jae Y Lee
*Assistant Examiner* — Jean F Voltaire
(74) *Attorney, Agent, or Firm* — Leydig, Voit & Mayer, Ltd.

(57) ABSTRACT

This application provides a data transmission link establishment apparatus. The apparatus includes: a selection unit, configured to select a target node; a determining unit, configured to determine a backhaul node that needs to establish a data transmission link with the target node selected by the selection unit; a setting unit, configured to set protocol stack roles, in the data transmission link, of the target node and the backhaul node that is determined by the determining unit; and a configuration unit, configured to perform configuration on the target node and the backhaul node according to the protocol stack roles that are set by the setting unit, to establish the data transmission link between the target node and the backhaul node.

12 Claims, 6 Drawing Sheets

(51) Int. Cl.
*H04W 28/10* (2009.01)
*H04W 92/04* (2009.01)
*H04W 56/00* (2009.01)
*H04W 80/00* (2009.01)
*H04W 84/04* (2009.01)

(56) References Cited

U.S. PATENT DOCUMENTS

| | | | |
|---|---|---|---|
| 2008/0310343 A1 | 12/2008 | Balachandran et al. | |
| 2011/0026425 A1* | 2/2011 | Picard | G01D 4/004 370/252 |
| 2012/0044836 A1* | 2/2012 | Sivavakeesar | H04W 24/02 370/255 |
| 2013/0181848 A1* | 7/2013 | Picard | G01D 4/004 340/870.03 |
| 2013/0244659 A1 | 9/2013 | Murasawa | |
| 2013/0310052 A1* | 11/2013 | Timus | H04W 72/0433 455/445 |
| 2013/0329694 A1* | 12/2013 | Vrzic | H04W 36/165 370/331 |
| 2014/0206368 A1 | 7/2014 | Maltsev et al. | |
| 2014/0248897 A1* | 9/2014 | Sfar | H04W 28/08 455/453 |

FOREIGN PATENT DOCUMENTS

| | | |
|---|---|---|
| CN | 103533506 A | 1/2014 |
| EP | 2621219 A1 | 7/2013 |
| JP | 2010530177 A | 9/2010 |
| JP | 2013197895 A | 9/2013 |
| JP | 2014504838 A | 2/2014 |
| WO | 2012039044 A1 | 3/2012 |
| WO | 2013110323 A1 | 8/2013 |
| WO | 2014000128 A1 | 1/2014 |

\* cited by examiner

DATA TRANSMISSION LINK ESTABLISHMENT APPARATUS AND METHOD, AND COMMUNICATIONS SYSTEM

CROSS-REFERENCE TO RELATED APPLICATIONS

This application is continuation of International Application No. PCT/CN2014/086206, filed on Sep. 10, 2014, the disclosure of which is hereby incorporated by reference in its entirety.

TECHNICAL FIELD

The present invention relates to the mobile communications field, and in particular, to a data transmission link establishment apparatus and method, and a communications system.

BACKGROUND

In a network evolution process of a Long Term Evolution (LTE for short)/LTE-Advanced (LTE-A for short) system of the 3rd Generation Partnership Project (3GPP for short), an evolution trend from a homogeneous network to a heterogeneous network is shown. In the homogeneous network, a high power macro base station with a relatively large coverage area forms continuous coverage in a cellular network shape. In the heterogeneous network, more small cells are increased on the basis of the coverage of the macro base station to further increase a network capacity. With an increase in a wireless system capacity requirement, small cell intensification is one of main technical directions for satisfying the capacity requirement.

However, there are plenty of actual difficulties in a specific implementation process of small cell intensification. How to address data backhaul of a large quantity of small cells is one of key problems. The data backhaul herein generally refers to data transmission between an access point (AP) such as a small cell and a core network (Core Network). In the prior art, the data backhaul may be implemented in a wired manner, or the data backhaul may be implemented in a wireless manner. From perspectives of connection stability and a backhaul capacity, a wired backhaul manner is used by the small cell to complete backhaul. However, deploying a wired connection, such as a fiber, requires slotted construction. A city area in which small cells need to be deployed intensively usually does not have a condition for slotted construction, and the wired connection cannot be deployed. In this case, in a network, maybe only some small cells can perform data backhaul by using the wired connection, and other small cells have to complete backhaul in a wireless manner.

In a wireless backhaul technology, a relay technical solution provided by LTE is usually used to implement backhaul of a small cell. The relay technical solution includes a relay node, a terminal device, and a host node (Donor-eNB) that is connected to a core network. The relay node establishes a wireless connection with the host node by using a Un interface when backhaul needs to be performed, and completes backhaul by using the host node. The host node may be a macro base station, and the relay node may be a small cell.

Because a relationship between the host node and the relay node is one-to-many, multiple relay nodes need to complete backhaul by using a same host node. In an actual situation of intensive small cell deployment, because there are many relay nodes connected to the host node, to ensure that all the relay nodes can implement backhaul, a data transmission rate that can be supported between the host node and each relay node is limited. When a data amount of backhaul data of the relay node is relatively large, a backhaul capability may be inadequate because of a limitation of the data transmission rate, thereby affecting data backhaul.

SUMMARY

Embodiments of the present invention provide a data transmission link establishment apparatus and method, and a communications system, to resolve a problem that data backhaul is affected because a backhaul capability may be inadequate by using the prior art.

According to a first aspect, an embodiment of the present invention provides a data transmission link establishment apparatus, including:

a selection unit, configured to select a target node; a determining unit, configured to determine a backhaul node that needs to establish a data transmission link with the target node selected by the selection unit; a setting unit, configured to set protocol stack roles, in the data transmission link, of the target node and the backhaul node that is determined by the determining unit; and a configuration unit, configured to perform configuration on the target node and the backhaul node according to the protocol stack roles that are set by the setting unit, to establish the data transmission link between the target node and the backhaul node.

With reference to the first aspect, in a first possible implementation manner of the first aspect, the selection unit includes: a capability detection subunit, configured to detect a data backhaul capability between each access node and a host node; and an access node selection subunit, configured to select, according to a detection result of the capability detection subunit, an access node with an inadequate data backhaul capability as the target node.

With reference to the first aspect or the first possible implementation manner of the first aspect, in a second possible implementation manner of the first aspect, the determining unit is specifically configured to select an access node as the backhaul node, where the access node has an idle data transmission resource and can establish, by using an air interface, a connection with the target node selected by the selection unit.

With reference to the second possible implementation manner of the first aspect, in a third possible implementation manner of the first aspect, the setting unit includes: a direction determining subunit, configured to determine a data transmission direction between the target node and the backhaul node; a channel selection subunit, configured to select a channel used for data transmission between the target node and the backhaul node; and a role setting subunit, configured to determine the protocol stack roles of the target node and the backhaul node according to the data transmission direction determined by the direction determining subunit and the channel selected by the channel selection subunit.

With reference to the first aspect or the first possible implementation manner of the first aspect or the second possible implementation manner of the first aspect, in a fourth possible implementation manner of the first aspect, the configuration unit includes: a configuration information generation subunit, configured to generate first configuration information and second configuration information, where the first configuration information is used to configure a protocol stack role of the backhaul node relative to the target node, and the second configuration information is used to configure a protocol stack role of the target node relative to the backhaul node; and a configuration information sending subunit, configured to send the first configuration information generated by the configuration information generation subunit to the backhaul node, and send the second configuration information generated by the configuration information generation subunit to the target node.

According to a second aspect, an embodiment of the present invention provides a data transmission link establishment method, including:

selecting a target node; determining a backhaul node that needs to establish a data transmission link with the target node; setting protocol stack roles of the target node and the backhaul node in the data transmission link; and configuring the target node and the backhaul node according to the protocol stack roles to establish the data transmission link between the target node and the backhaul node.

With reference to the second aspect, in a first possible implementation manner of the second aspect, the selecting a target node includes: detecting a data backhaul capability of each access node; and selecting an access node with an inadequate data backhaul capability as the target node.

With reference to the second aspect or the first possible implementation manner of the second aspect, in a second possible implementation manner of the second aspect, the determining a backhaul node that needs to establish a data transmission link with the target node includes: selecting an access node as the backhaul node, where the access node has an idle data transmission resource and can establish a connection with the target node by using an air interface.

With reference to the second possible implementation manner of the second aspect, in a third possible implementation manner of the second aspect, the setting protocol stack roles of the target node and the backhaul node in the data transmission link includes: determining a data transmission direction between the target node and the backhaul node; selecting a channel used for data transmission between the target node and the backhaul node; and determining the protocol stack roles of the target node and the backhaul node according to the data transmission direction and the channel.

With reference to the second aspect or the first possible implementation manner of the second aspect or the second possible implementation manner of the second aspect, in a fourth possible implementation manner of the second aspect, the configuring the target node and the backhaul node according to the protocol stack roles includes: generating first configuration information and second configuration information, where the first configuration information is used to configure a protocol stack role of the backhaul node relative to the target node, and the second configuration information is used to configure a protocol stack role of the target node relative to the backhaul node; sending the first configuration information to the backhaul node; and sending the second configuration information to the target node.

According to a third aspect, an embodiment of the present invention provides a communications system, where the communications system includes a host node and at least two access nodes, the host node is configured to select a target node from the access nodes, determine a backhaul node that is in the access nodes and that needs to establish a data transmission link with the target node, set protocol stack roles of the target node and the backhaul node in the data transmission link, and configure the target node and the backhaul node according to the protocol stack roles to establish the data transmission link between the target node and the backhaul node.

In the embodiments of the present invention, a selection unit is configured to select a target node, a determining unit is configured to determine a backhaul node that needs to establish a data transmission link with the target node selected by the selection unit, a setting unit is configured to set protocol stack roles, in the data transmission link, of the target node and the backhaul node that is determined by the determining unit; and a configuration unit is configured to perform configuration on the target node and the backhaul node according to the protocol stack roles that are set by the setting unit, to establish the data transmission link between the target node and the backhaul node. When a backhaul capability of an access node is inadequate, the method provided in the embodiments of the present invention may be used to establish a data transmission link between the access node and another access node, so that a data transmission resource of the another access node may be used to assist the target node in performing data backhaul, thereby preventing the access node from affecting data transmission because of an inadequate backhaul capability of a default backhaul path.

BRIEF DESCRIPTION OF THE DRAWINGS

To describe the technical solutions in the embodiments of the present invention more clearly, the following briefly introduces the accompanying drawings required for describing the embodiments. Apparently, persons of ordinary skill in the art may still derive other drawings from these accompanying drawings without creative efforts.

DETAILED DESCRIPTION

It should be noted herein that an access node described in the embodiments of the present invention may be an access node such as a small cell, or may be another communications device.

Figure 1A:
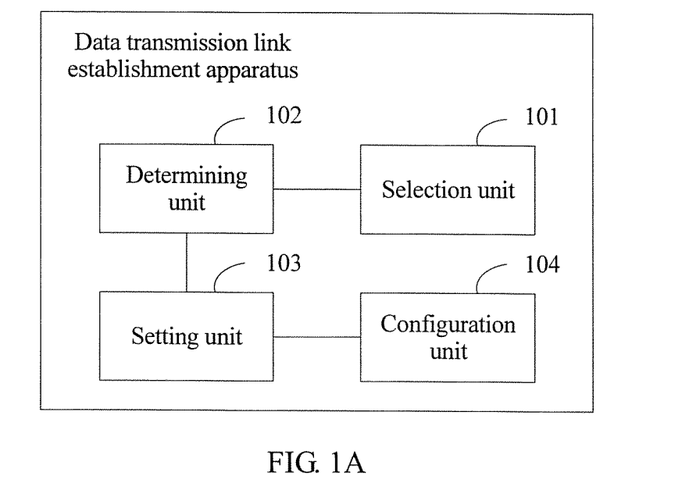
FIG. 1A is a schematic diagram of an embodiment of a data transmission link establishment apparatus according to the present invention.

Referring to FIG. 1A, FIG. 1A is a schematic diagram of an embodiment of a data transmission link establishment apparatus. The data transmission link establishment apparatus may be disposed on a host node, or may be a host node.

As shown in FIG. 1A, the apparatus includes a selection unit 101, a determining unit 102, a setting unit 103, and a configuration unit 104.

The selection unit 101 is configured to select a target node.

The selection unit 101 first selects the target node that needs to establish a data transmission link. The target node may be an access node whose data backhaul capability of a default backhaul path established in a relay technical solution is inadequate, or may be another access node that meets a predetermined condition, for example, may be a target node or a backhaul node in an established data transmission link.

Figure 1B:
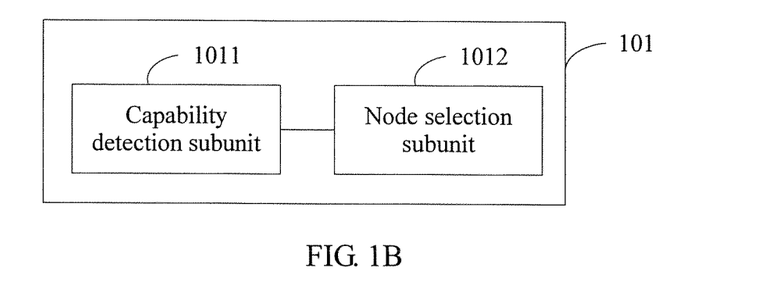
FIG. 1B is a schematic diagram of an embodiment of a selection unit of a data transmission link establishment apparatus according to the present invention.

As shown in FIG. 1B, the selection unit 101 may include a capability detection subunit 1011, configured to detect a data backhaul capability between each access node and a host node, and an access node selection subunit 1012, configured to select an access node with an inadequate data backhaul capability as the target node.

In an actual situation of intensive access node deployment, because there are many access nodes connected to a host node, to ensure that all the access nodes can implement backhaul, a data transmission rate that can be supported by a default backhaul path between the host node and the access node is limited; therefore, a backhaul capability of the access node may be inadequate. The capability detection subunit 1011 may detect the data backhaul capability of the access node when each access node is accessed, or may detect the data backhaul capability of the access node in a data transmission process according to a data transmission status of the default backhaul path between the access node and the host node.

The access node selection subunit 1012 may select, after detecting the backhaul capability of the access node, an access node whose data backhaul capability cannot meet a backhaul requirement as the target node. It should be noted herein that the backhaul capability of the access node may refer to an uplink backhaul capability or a downlink backhaul capability between the access node and the host node.

The determining unit 102 is configured to determine a backhaul node that needs to establish a data transmission link with the target node. Specifically, the determining unit 102 may be configured to select an access node as the backhaul node, where the access node has an idle data transmission resource and can establish a connection with the target node by using an air interface.

The backhaul node may be one or more access nodes that are currently in an idle state or have relatively light load. Because the access node and the host node may be connected in a wired connection or a wireless connection, an access node connected to the host node in a wired connection manner is referred to as a wired access node subsequently, and an access node connected to the host node in a wireless connection manner is referred to as a wireless access node subsequently. Because a data transmission rate that the wired connection can support is usually far higher than a data transmission rate that the wireless connection can support, a backhaul capability of the wired access node is higher than that of the wireless access node. When determining the backhaul node, the determining unit 102 may select the wired access node as the backhaul node. In addition, an access node that has a backhaul capability may implement backhaul in a manner of microwave, asymmetric digital subscriber line (ADSL, Asymmetric Digital Subscriber Line), WiFi (Wireless Fidelity), or the like. All these access nodes can be the backhaul node. In addition, an access node that does not have a backhaul capability may resolve a problem in backhaul for another access node in a transit manner. These access nodes can also be selected as the backhaul node.

The setting unit 103 is configured to set protocol stack roles of the target node and the backhaul node in the data transmission link.

A structure of the data transmission link may be determined according to a disposition location of the access node and an idle data transmission resource quantity of the access node. When there is one backhaul node, the data transmission link may include only a sublink between the target node and the backhaul node. When there are multiple backhaul nodes, the data transmission link includes parallel sublinks between the target node and each backhaul node, or the data transmission link may include a sublink between the target node and the backhaul node and a sublink between different backhaul nodes. The path described in this embodiment of the present invention refers to a data transmission path between different base stations or between different access nodes.

Figure 1C:
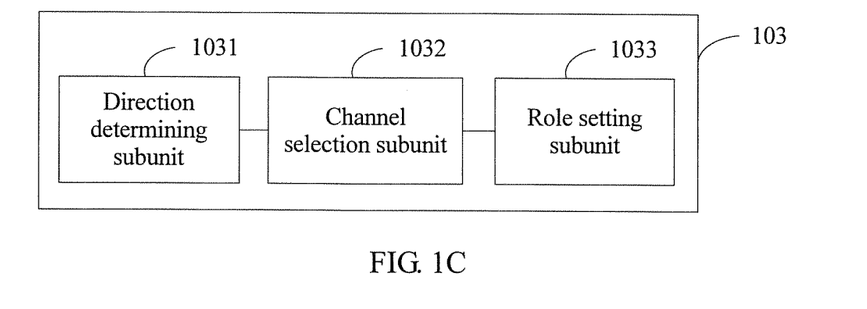
FIG. 1C is a schematic diagram of an embodiment of a setting unit of a data transmission link establishment apparatus according to the present invention.

As shown in FIG. 1C, the setting unit 103 may include: a direction determining subunit 1031, configured to determine a data transmission direction between the target node and the backhaul node; a channel selection subunit 1032, configured to select a channel used for data transmission between the target node and the backhaul node; and a role setting subunit 1033, configured to determine the protocol stack roles of the target node and the backhaul node according to the data transmission direction and the channel.

That there is only one backhaul node is used as an example. After the target node and the backhaul node are determined, the direction determining subunit 1031 determines the data transmission direction between the target node and the backhaul node according to a data transmission direction between the target node and the host node. For example, when a downlink capability of the target node is inadequate, and an intermediate access node is needed to assist in completion of downlink data transmission, it may be determined that the data transmission direction is from the backhaul node to the target node; or when an uplink capability of the target node is inadequate, and an intermediate access node is needed to assist in completion of uplink data transmission, it may be determined that the data transmission direction is from the target node to the backhaul node.

Because both the target node and the backhaul node have at least two protocol stacks: an eNB function protocol stack and a UE function protocol stack, when data is transmitted from the target node to the backhaul node, the target node may be used as UE (User Equipment), the backhaul node as an evolved NodeB (eNB), and data transmission is performed by using a physical uplink shared channel (PUSCH); or the target node may be used as an eNB, the backhaul node as UE, and data transmission is performed by using a physical downlink shared channel (PDSCH). Therefore, the channel selection subunit 1032 needs to select the channel used for data transmission between the target node and the backhaul node. The host node may select, according to a channel usage status of the target node and the backhaul node, whether the PUSCH or the PDSCH is used to perform data transmission. For example, when the PUSCH of the target node is fully used, a channel used for data transmission between the PDSCH of the target node and the backhaul node may be selected.

After the data transmission direction and the channel are determined, the role setting subunit 1033 determines the protocol stack roles of the target node and the backhaul node according to the data transmission direction and the channel. For example, when the data transmission direction is from the backhaul node to the target node, and the PUSCH is selected, the backhaul node may be used as UE relative to the target node, and the target node as an eNB relative to the backhaul node.

In a process of determining the protocol stack role of the access node, multiple factors may be considered to perform setting. For example, the protocol stack role of the access node may be determined according to which of the backhaul node and the target node is used to control data transmission scheduling in each timeslot, that is, a site that is responsible for scheduling is used as an eNB role; in addition, the protocol stack role of the access node may be determined according to a resource usage status of the backhaul node and the target node. For example, when UE further accesses the backhaul node, the backhaul node may implement, by selecting the backhaul node as an eNB role and the target node as a UE role, resource multiplexing with the UE that is served by the backhaul node.

The configuration unit 104 is configured to perform configuration on the target node and the backhaul node according to the protocol stack roles to establish the data transmission link between the target node and the backhaul node.

Figure 1D:
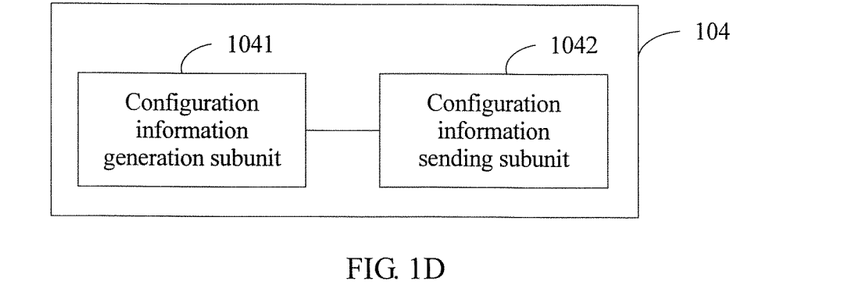
FIG. 1D is a schematic diagram of an embodiment of a configuration unit of a data transmission link establishment apparatus according to the present invention.

As shown in FIG. 1D, the configuration unit 104 may include: a configuration information generation subunit 1041, configured to generate first configuration information and second configuration information, where the first configuration information is used to configure a protocol stack role of the backhaul node relative to the target node, and the second configuration information is used to configure a protocol stack role of the target node relative to the backhaul node; and a configuration information sending subunit 1042, configured to send the first configuration information to the backhaul node, and send the second configuration information to the target node.

That there is only one backhaul node is used as an example. After the protocol stack roles of the backhaul node and the target node are determined, the configuration information generation subunit 1041 separately generates the first configuration information and the second configuration information. After the first configuration information and the second configuration information are generated, the configuration information sending subunit 1042 sends the first configuration information and the second configuration information to the target node. After receiving the first configuration information, the backhaul node matches a cell_id and a ue_id that are included in the first configuration information with a cell_id and a ue_id that are of the backhaul node, so as to know the protocol stack role that the backhaul node shall play in the data transmission link, determines a protocol stack according to an indication of the first configuration information, and configures the protocol stack role of the target node on the protocol stack. After receiving the second configuration information, the target node matches a cell_id and a ue_id that are included in the second configuration information with a cell_id and a ue_id that are of the target node, so as to know the protocol stack role that the target node shall play in the data transmission link, determines a protocol stack according to an indication of the second configuration information, and configures the protocol stack role of the target node on the protocol stack.

In this embodiment, a selection unit is configured to select a target node, a determining unit is configured to determine a backhaul node that needs to establish a data transmission link with the target node selected by the selection unit, a setting unit is configured to set protocol stack roles, in the data transmission link, of the target node and the backhaul node that is determined by the determining unit, and a configuration unit is configured to perform configuration on the target node and the backhaul node according to the protocol stack roles that are set by the setting unit, to establish the data transmission link between the target node and the backhaul node. When a backhaul capability of an access node is inadequate, the method provided in this embodiment of the present invention may be used to establish a data transmission link between the access node and another access node, so that a data transmission resource of the another access node may be used to assist the target node in performing data backhaul, thereby preventing the access node from affecting data transmission because of an inadequate backhaul capability of a default backhaul path.

Figure 2:
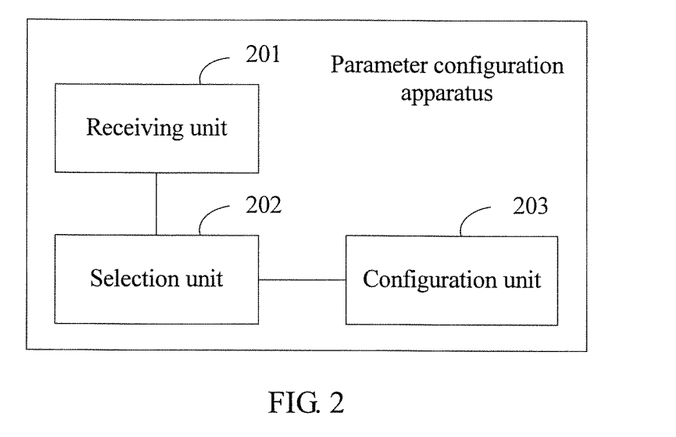
FIG. 2 is a schematic diagram of another embodiment of a data transmission link establishment apparatus according to the present invention.

Referring to FIG. 2, FIG. 2 is a schematic diagram of another embodiment of a data transmission link establishment apparatus. The data transmission link establishment apparatus may be disposed on an access node, or may be an access node. The access node may be an AP such as a small cell.

As shown in FIG. 2, the data transmission link establishment apparatus includes a receiving unit 201, a selection unit 202, and a configuration unit 203.

The receiving unit 201 is configured to receive configuration information sent by a host node.

The receiving unit 201 first receives the configuration information sent by the host node. The configuration information may be generated by the host node, and includes an access node ID that is configured as an eNB role, an access node ID that is configured as a UE role, a carrier ID that is used for establishing a data transmission link, a subframe set that is used for establishing the data transmission link, and other content that is related to establishing the data transmission link.

The selection unit 202 is configured to select a protocol stack according to the configuration information.

After receiving the configuration information, the selection unit 202 may determine the used protocol stack according to role information included in the configuration information. For example, when the access node needs to be configured as UE, a UE protocol stack is selected, or when the access node needs to be configured as an eNB, an eNB protocol stack is selected.

The configuration unit 203 is configured to perform configuration on the protocol stack, the access node as a protocol stack role specified by the configuration information.

After the protocol stack is selected, the configuration unit 203 configures a target node according to content of the configuration information, including the carrier ID used for configuring and establishing the data transmission link, the subframe set used for establishing the data transmission link, and the like. In this way, the target node and the backhaul node are connected by using a Uub interface. The Uub interface herein is an extension of a Uu interface, and is specially configured to transmit backhaul data between access nodes. A characteristic of the interface is that establishment and release of the interface are controlled by a control access node, for example, as a host access node, and the Uu interface is reused as much as possible on a used physical channel, so as to flexibly multiplex backhaul data transmission and access data transmission.

In this embodiment, the receiving unit is configured to receive the configuration information sent by the host node, the selection unit is configured to select the protocol stack according to the configuration information, and the configuration unit is configured to perform configuration on the protocol stack, the access node as a protocol stack role specified by the configuration information. When a backhaul capability of an access node is inadequate, the method provided in this embodiment of the present invention may be used to establish a data transmission link between the access node and another access node, so that a data transmission resource of the another access node may be used to assist the target node in performing data backhaul, thereby preventing the access node from affecting data transmission because of an inadequate backhaul capability of a default backhaul path.

Corresponding to the data transmission link establishment apparatus in the present invention, the present invention further provides a data transmission link establishment method.

Figure 3:
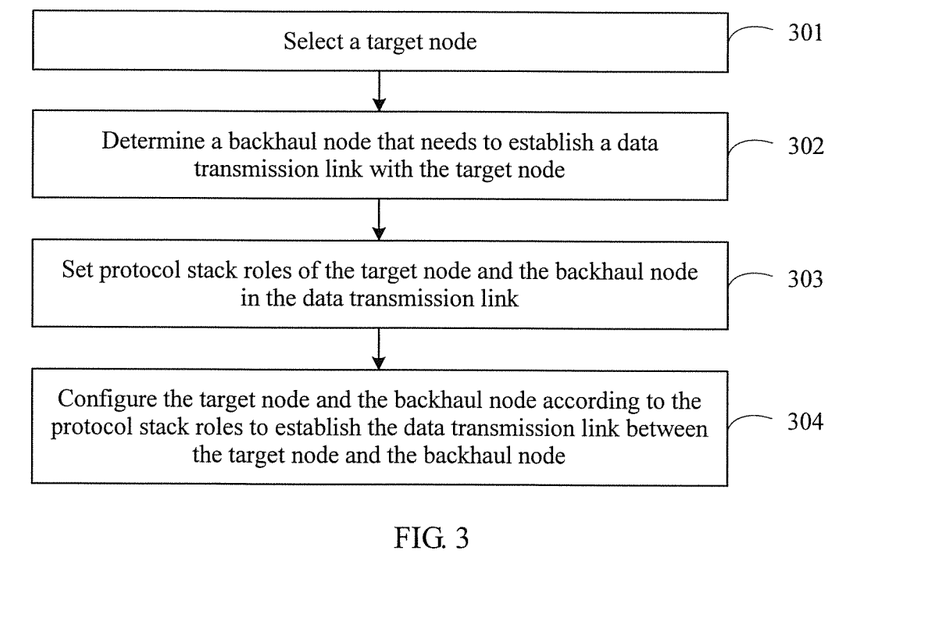
FIG. 3 is a flowchart of an embodiment of a data transmission link establishment method according to the present invention.

Referring to FIG. 3, FIG. 3 is a schematic diagram of an embodiment of a data transmission link establishment method according to the present invention. The method in this embodiment may be performed by a host node. The host node may have only an eNB protocol stack, and can connect to an access node by using an X2 interface or by using a Un interface on a default carrier. The access node may have both an eNB protocol stack and a UE protocol stack.

Step 301: Select a target node.

The host node first selects the target node that needs to establish a data transmission link. The target node maybe an access node whose data backhaul capability of a default backhaul path established in a relay technical solution is inadequate, or may be another access node that meets a predetermined condition, for example, may be a target node or a backhaul node in an established data transmission link.

Step 302: Determine a backhaul node that needs to establish a data transmission link with the target node.

The backhaul node may be one or more access nodes that are currently in an idle state or have relatively light load. Because the access node and the host node may be connected in a wired connection or a wireless connection, an access node connected to the host node in a wired connection manner is referred to as a wired access node subsequently, and an access node connected to the host node in a wireless connection manner is referred to as a wireless access node subsequently. Because a data transmission rate that the wired connection can support is usually far higher than a data transmission rate that the wireless connection can support, a backhaul capability of the wired access node is higher than that of the wireless access node. When the backhaul node is determined, the wired access node may be selected as the backhaul node. In addition, an access node that has a backhaul capability may implement backhaul in a manner of microwave, ADSL, WiFi, or the like. All these access nodes can be the backhaul node. In addition, an access node that does not have a backhaul capability may resolve a problem in backhaul for another access node in a transit manner. These access nodes can also be selected as the backhaul node.

A structure of the data transmission link may be determined according to a disposition location of the access node and an idle data transmission resource quantity of the access node. When there is one backhaul node, the data transmission link may include only a sublink between the target node and the backhaul node. When there are multiple backhaul nodes, the data transmission link includes parallel sublinks between the target node and each backhaul node, or the data transmission link may include a sublink between the target node and the backhaul node and a sublink between different backhaul nodes. The path described in this embodiment of the present invention refers to a data transmission path between different base stations or between different access nodes.

Step 303: Set protocol stack roles of the target node and the backhaul node in the data transmission link.

After the data transmission link and the backhaul node are determined, a data transmission direction between the target node and the backhaul node needs to be determined first, for example, it is determined whether data is mainly sent from the target node to the host node, or from the host node to the target node. Because the target node and the backhaul node described herein may both have two protocol stack functions, that is, have both an eNB function and a UE function, it needs to be further determined whether the target node performs backhaul data transmission by using an uplink data channel or a downlink data channel, that is, a channel used for data transmission between the target node and the backhaul node needs to be selected. After the data transmission direction and the channel are determined, the protocol stack roles of the target node and the backhaul node are determined according to the data transmission direction and the channel. That is, the foregoing protocol stack roles are determined by determining the data transmission direction and a physical channel type used by data. For example, if the data transmission direction is from the backhaul node to the target node, and determined that data is transmitted by using a physical downlink shared channel (PDSCH), for the link between the target node and the backhaul node, the backhaul node plays a role of an eNB, and the target node plays a role of UE. In a process of determining a role of the access node, multiple factors need to be considered to perform determining. For example, the role of the access node may be determined according to which of the backhaul node and the target node is used to control data transmission scheduling in each timeslot, that is, a site that is responsible for scheduling is used as an eNB role; in addition, the role of the access node may be determined according to a resource usage status of the backhaul node and the target node. For example, when UE further accesses the backhaul node, the backhaul node may implement, by selecting the backhaul node as an eNB role and the target node as a UE role, resource multiplexing with the UE that is served by the backhaul node.

When the structure of the data transmission link is relatively complex, a protocol stack role of each access node in the target node and the backhaul node needs to be determined, for example, a protocol stack role of the target node relative to the backhaul node, a protocol stack role of the backhaul node relative to the target node, and a relative protocol stack role between different backhaul nodes.

It should be noted herein that if the target node or the backhaul node has only one protocol stack, the host node may determine a protocol stack of another access node according to the protocol stack that the target node or the backhaul node has.

Step 304: Configure the target node and the backhaul node according to the protocol stack roles to establish the data transmission link between the target node and the backhaul node.

When the target node and the backhaul node are configured, a manner of generating configuration information and sending the configuration information may be used. The host node first generates first configuration information and second configuration information, where the first configuration information is used to configure a protocol stack role of the backhaul node, and the second configuration information is used to configure a protocol stack role of the target node; then the first configuration information is sent to the backhaul node, and the second configuration information is sent to the target node. The configuration information is used to configure a protocol layer status of the access node on some subframe resources of a specified carrier.

A specific format of the first configuration information or the second configuration information may be:

FBH_ReConfig
{
FBH_connection_id, /* used to indicate that the message is configuration information that is used to establish a data transmission link */
Cell_id, /* used to indicate an access node ID that is configured as an eNB role */
Ue_id, /* used to indicate an access node ID that is configured as a UE role */
Carrier_id, /* used to indicate an ID of a used carrier */
Subframe_Subset, /* used to indicate a subframe set that is used for establishing a data transmission link */
}

After receiving the configuration information, the target node or the backhaul node configures its protocol stack role according to an indication of the configuration information, so as to establish the data transmission link between the target node and the backhaul node. When there are multiple backhaul nodes, the first configuration information includes multiple pieces of subinformation that separately configure each backhaul node.

In this embodiment of the present invention, a target node is selected, a backhaul node that needs to establish a data transmission link with the target node is determined, protocol stack roles of the target node and the backhaul node in the data transmission link are set, and the target node and the backhaul node are configured according to the protocol stack roles to establish the data transmission link between the target node and the backhaul node. When a backhaul capability of an access node is inadequate, the method provided in this embodiment of the present invention may be used to establish a data transmission link between the access node and another access node, so that a data transmission resource of the another access node may be used to assist the target node in performing data backhaul, thereby preventing the access node from affecting data transmission because of an inadequate backhaul capability of a default backhaul path.

The following uses one backhaul node as an example to further describe the present invention.

Figure 4:
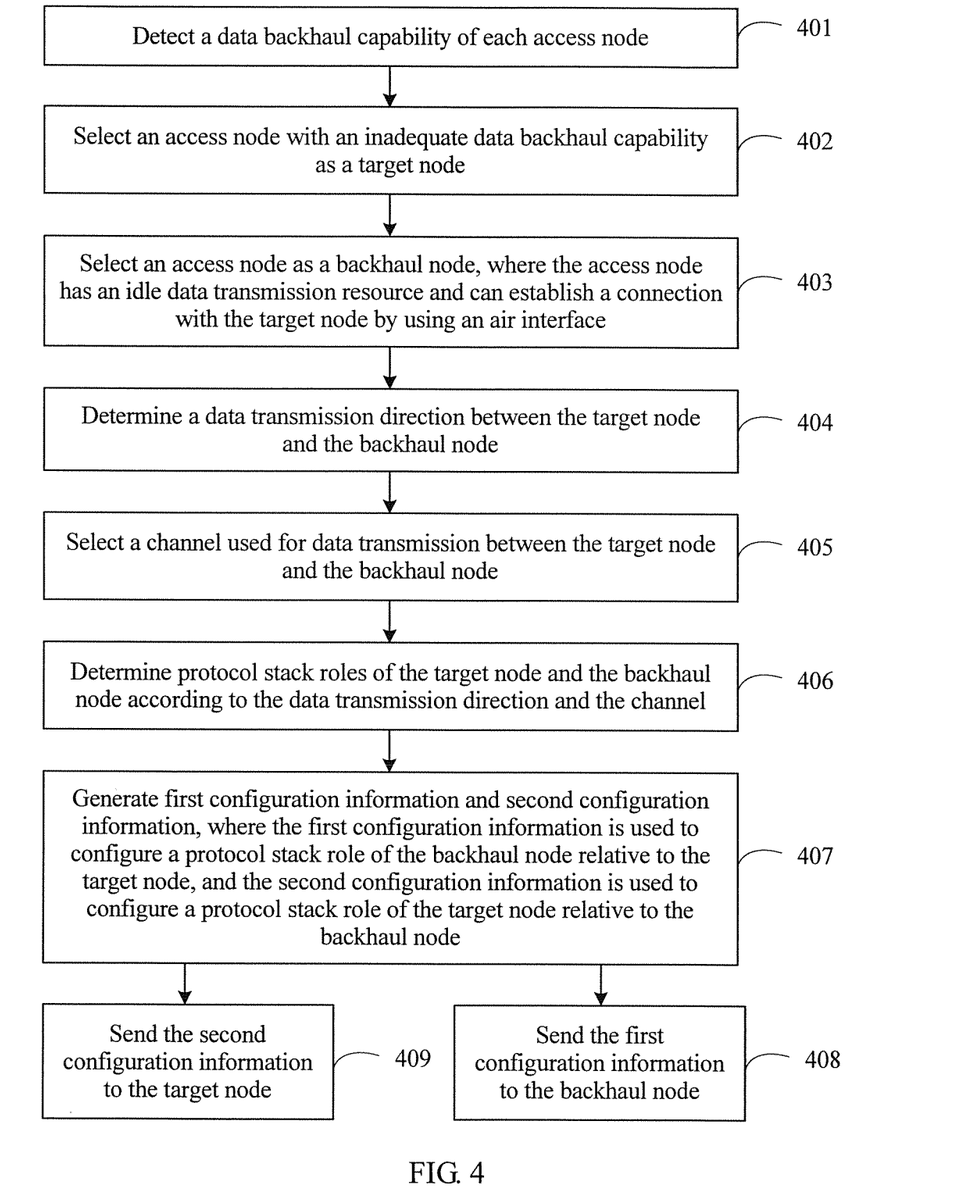
FIG. 4 is a flowchart of another embodiment of a data transmission link establishment method according to the present invention.

Referring to FIG. 4, FIG. 4 is a schematic diagram of an embodiment of a data transmission link establishment method according to the present invention.

Step 401: Detect a data backhaul capability of each access node.

In an actual situation of intensive access node deployment, because there are many access nodes connected to a host node, to ensure that all the access nodes can implement backhaul, a data transmission rate that can be supported by a default backhaul path between the host node and the access node is limited; therefore, a backhaul capability of the access node may be inadequate. The host node may detect the data backhaul capability of the access node when each access node is accessed, or may detect the data backhaul capability of the access node in a data transmission process according to a data transmission status of the default backhaul path between the access node and the host node.

Step 402: Select an access node with an inadequate data backhaul capability as a target node.

After the backhaul capability of the access node is detected, an access node whose data backhaul capability cannot meet a backhaul requirement is selected as the target node. It should be noted herein that the backhaul capability of the access node may refer to an uplink capability or a downlink capability between the access node and the host node.

Step 403: Select an access node as a backhaul node, where the access node has an idle data transmission resource and can establish a connection with the target node by using an air interface.

When the backhaul capability of the default backhaul path is inadequate, the host node may determine the backhaul node that is configured to assist the target node in performing backhaul. The host node sends, to the backhaul node, downlink data that needs to be sent to the target node, and then the backhaul node sends the downlink data to the target node. Alternatively, the target node sends, to the backhaul node, uplink data that needs to be sent to the host node, and then the backhaul node sends the uplink data to the host node. Generally, the host node may obtain, according to a disposition location of the access node, all access nodes that can connect to the target node by using an air interface, and then select one of the access nodes as the target node.

Step 404: Determine a data transmission direction between the target node and the backhaul node.

After the target node and the backhaul node are determined, the data transmission direction between the target node and the backhaul node is determined according to a data transmission direction between the target node and the host node. For example, when a downlink capability of the target node is inadequate, and an intermediate access node is needed to assist in completion of downlink data transmission, it may be determined that the data transmission direction is from the backhaul node to the target node; or when an uplink capability of the target node is inadequate, and an intermediate access node is needed to assist in completion of uplink data transmission, it may be determined that the data transmission direction is from the target node to the backhaul node.

Step 405: Select a channel used for data transmission between the target node and the backhaul node.

Because both the target node and the backhaul node have at least two protocol stacks, when data is transmitted from the target node to the backhaul node, the target node may be used as UE, the backhaul node as an eNB, and data transmission is performed by using a PUSCH, or the target node may be used as an eNB, the backhaul node as UE, and data transmission is performed by using a PDSCH. Therefore, the host node needs to select the channel used for data transmission between the target node and the backhaul node. The host node may select, according to a channel usage status of the target node and the backhaul node, whether the PUSCH or the PDSCH is used to perform data transmission. For example, when the PUSCH of the target node is fully used, a channel used for data transmission between the PDSCH of the target node and the backhaul node may be selected.

Step 406: Determine protocol stack roles of the target node and the backhaul node according to the data transmission direction and the channel.

After the data transmission direction and the channel are determined, the protocol stack roles of the target node and the backhaul node are determined according to the data transmission direction and the channel. For example, when the data transmission direction is from the backhaul node to the target node, and the PUSCH is selected, the backhaul node may be used as UE relative to the target node, and the target node as an eNB relative to the backhaul node.

Step 407: Generate first configuration information and second configuration information, where the first configuration information is used to configure a protocol stack role of the backhaul node relative to the target node, and the second configuration information is used to configure a protocol stack role of the target node relative to the backhaul node.

After the protocol stack roles of the backhaul node and the target node are determined, the host node separately generates the first configuration information and the second configuration information.

For example, it is assumed that the target node has a dual protocol stack, and corresponding ue_id and cell_id are respectively: {ue_id=001, cell_id=010}, and the backhaul node has a dual protocol stack, and corresponding ue_id and cell_id are respectively: {ue_id=002, cell_id=011}.

The first configuration information may be:

```
FBH_ReConfig
{
FBH_connection_id = 001;
Cell_id = 010;
Ue_id = 002;
Carrier_id = 003;
Subframe_Subset = {11111111}; /* represents using all subframes */
}
```

The second configuration information may be:

```
FBH_ReConfig
{
FBH_connection_id = 001;
Cell_id = 010;
Ue_id = 002;
Carrier_id = 003;
Subframe_Subset = {11111111}; /* represents using all subframes */
}
```

Step 408: Send the first configuration information to the backhaul node.

After the first configuration information is generated, the host node sends the first configuration information to the backhaul node. When the backhaul node is a wired access node, the host node may send the first configuration information by using an (X2) interface between base stations.

After receiving the first configuration information, the backhaul node determines a protocol stack according to an indication of the first configuration information, and configures the protocol stack role of the backhaul node on the protocol stack.

Step 409: Send the second configuration information to the target node.

After the second configuration information is generated, the host node sends the second configuration info nation to the target node. After receiving the second configuration information, the target node matches a cell_id and a ue_id that are included in the second configuration information with a cell_id and a ue_id that are of the target node, so as to know the protocol stack role that the target node shall play in the data transmission link, determines a protocol stack according to an indication of the second configuration information, and configures the protocol stack role of the target node on the protocol stack.

It should be noted herein that this embodiment uses only one backhaul node as an example to describe the present invention. In an actual application, there may be multiple backhaul nodes, and corresponding first configuration information also includes multiple pieces of subinformation that are respectively sent to different backhaul nodes; the target node may also be a backhaul node that uses a first access node as a target node and that is in an existing data transmission link, so that multiple data transmission links may constitute a data transmission path.

When a backhaul capability of an access node is inadequate, the method provided in this embodiment of the present invention may be used to establish a data transmission link between the access node and another access node, so that a data transmission resource of the another access node may be used to assist the target node in performing data backhaul, thereby preventing the access node from affecting data transmission because of an inadequate backhaul capability of a default backhaul path.

Figure 5:
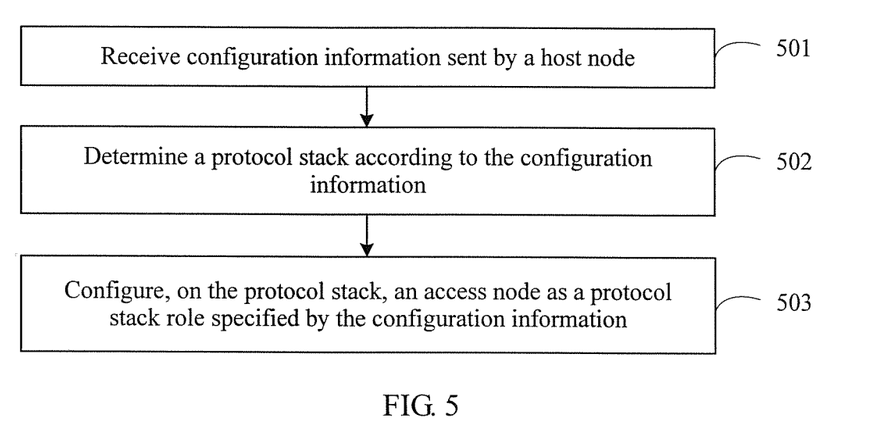
FIG. 5 is a flowchart of another embodiment of a data transmission link establishment method according to the present invention.

Referring to FIG. 5, FIG. 5 is a schematic diagram of another embodiment of a data transmission link establishment method. With reference to FIG. 3, the following further describes the data transmission link establishment method in the present invention from a side of an access node. The access node in this embodiment may be a target node, or may be a backhaul node.

Step 501: Receive configuration information sent by a host node.

An access node first receives the configuration information sent by the host node. The configuration information may be generated by the host node, and includes an access node ID that is configured as an eNB role, an access node ID that is configured as a UE role, a carrier ID that is used for establishing a data transmission link, a subframe set that is used for establishing the data transmission link, and other content that is related to establishing the data transmission link. A specific format of the configuration information is described in the foregoing embodiment, and details are not described herein again.

Step 502: Determine a protocol stack according to the configuration information.

After receiving the configuration information, the access node may determine the used protocol stack according to role information included in the configuration information. For example, when the access node needs to be configured as UE, a UE protocol stack is selected, or when the access node needs to be configured as an eNB, an eNB protocol stack is selected.

Step 503: Configure, on the protocol stack, the access node as a protocol stack role specified by the configuration information.

After the protocol stack is selected, a target node is configured according to content of the configuration information, including the carrier ID used for configuring and establishing the data transmission link, the subframe set used for establishing the data transmission link, and the like. In this way, the target node and the backhaul node are connected by using a Uub interface. The Uub interface herein is an extension of a Uu interface, and is specially configured to transmit backhaul data between access nodes. A characteristic of the interface is that establishment and release of the interface are controlled by a control access node (for example, as a host access node), and the Uu interface is reused as much as possible on a used physical channel, so as to flexibly multiplex backhaul data transmission and access data transmission.

When a backhaul capability of an access node is inadequate, the method provided in this embodiment of the present invention may be used to establish a data transmission link between the access node and another access node, so that a data transmission resource of the another access node may be used to assist the target node in performing data backhaul, thereby preventing the access node from affecting data transmission because of an inadequate backhaul capability of a default backhaul path.

Figure 6A:
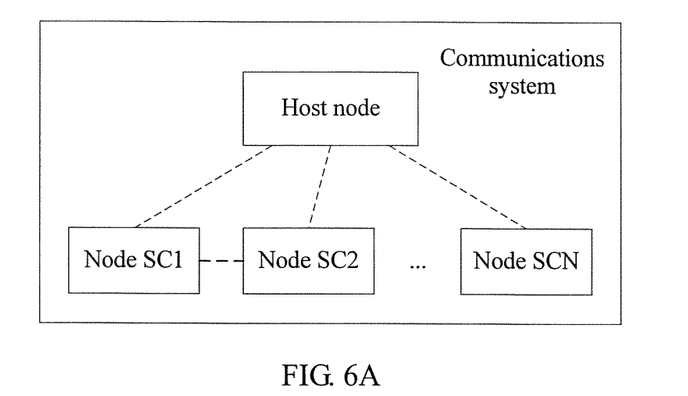
FIG. 6A is a schematic diagram of a communications system according to the present invention.

Referring to FIG. 6A, FIG. 6A is a schematic diagram of an embodiment of a communications system.

As shown in FIG. 6A, the system includes a host node and at least two access nodes. Each access node is expressed as an access node SC1 to an access node SCN, and a dashed line represents that a data transmission link can be established between the host node and the access node or between the access nodes. The host node is configured to select a target node from the access nodes, determine a backhaul node that is in the access nodes and that needs to establish a data transmission link with the target node, set protocol stack roles of the target node and the backhaul node in the data transmission link, and configure the target node and the backhaul node according to the protocol stack roles to establish the data transmission link between the target node and the backhaul node.

For example, when the host node discovers that a default backhaul capability of the access node SC1 cannot meet a QoS requirement of to-be-transmitted data, the access node SC1 is selected as the target node.

Figure 6B:
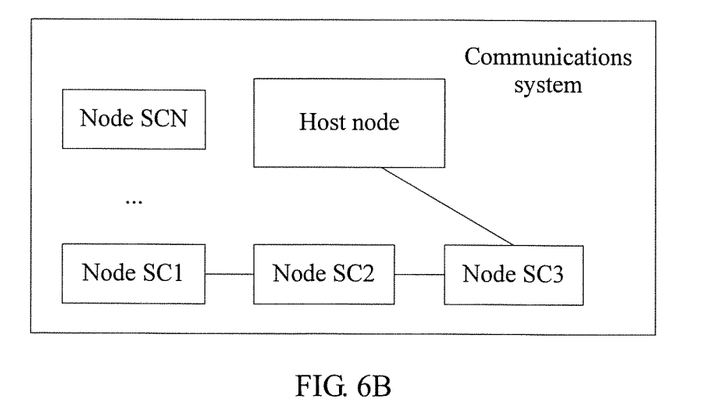
FIG. 6B is another schematic diagram of a communications system according to the present invention.

As shown in FIG. 6B, when it is discovered, by using an optimization algorithm, that a backhaul resource required by the access node SC1 can be provided in a data transmission link of SC3-SC2-SC1, the access node SC2 and the access node SC3 may be determined as the backhaul nodes. The access node SC3 may be a wired access node. It is assumed that the host node discovers that data may be transmitted on some subframes of a carrier 2 by using a PDSCH channel, and by using the access node SC3 as an eNB and the access node SC2 as UE, and data may be transmitted on a carrier 3 by using a PUSCH, and by using the access node SC2 as UE and the access node SC1 as an eNB. The host node sends a resource reconfiguration message to the SC1 to configure a protocol stack role of the access node SC1 relative to the access node SC2 on the carrier 3; sends the resource reconfiguration message to the SC2 to configure a protocol stack role of the access node SC2 relative to the access node SC1 on the carrier 3, and a protocol stack role of the access node SC2 relative to the access node SC3 on the carrier 2; and sends the resource reconfiguration message to the access node SC3 to configure a protocol stack role of the SC3 relative to the access node SC2 on the carrier 2. The foregoing resource reconfiguration message indicates implicitly that a specified resource may be used in flexible backhaul. After receiving the resource reconfiguration message, the access node SC1, the access node SC2, and the access node SC3 establish a data transmission link according to the resource reconfiguration message, and perform backhaul data transmission on received to-be-backhauled data after the data transmission link is established.

Further, if detecting that backhaul data of the SC1 can be supported by default backhaul, the host node may send a new resource reconfiguration message to disconnect the data transmission link and release a backhaul resource. When the data transmission link encounters a fault, a new backhaul node may be searched for to establish a new data transmission link. A specific process is not described in detail herein.

Figure 6C:
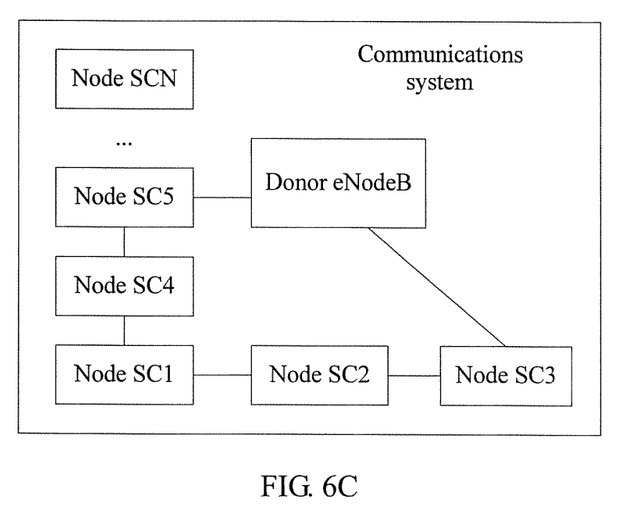
FIG. 6C is another schematic diagram of a communications system according to the present invention.

If a backhaul requirement of the access node SC1 further increases, a current backhaul capacity still cannot meet a requirement, and a network further increases the backhaul resource for the SC1, the host node may search for another backhaul node. For example, as shown in FIG. 6C, when the host node discovers that the backhaul resource required by the access node SC1 can be provided in a transmission path of SC5-SC4-SC1, the access node SC5 and the access node SC4 may be determined as the backhaul nodes. The access node SC4 is configured as UE on the carrier 3 to access the SC1, so as to form visual MIMO in an uplink with the access node SC2, and improve the backhaul capability of the SC1 by using a spatial multiplexing capability; in addition, the access node SC5 is configured as an eNB on the carrier 2 and the access node SC4 as UE to form a complete backhaul path. When there are multiple data transmission links, that is, there are multiple backhaul paths from the host node to the access node SC1, data may be split properly at the host node to balance load on the multiple paths.

When an access requirement of the access node changes, a role of the access node on the data transmission link may be adjusted to simultaneously consider objectives of backhaul and the access requirement. For example, in a process of backhaul data transmission, if the host node obtains information indicating that the access node SC2 needs more access resources, the host node may send resource reconfiguration message, configure the SC2 as an eNB role and the SC1 as a UE role on the carrier 3. In this way, the SC2 can multiplex the access data transmission and the data transmission link on the carrier 3. For example, spatial multiplexing is implemented by using a multi-antenna technology.

When a backhaul capability of an access node in the communications system is inadequate, the method provided in this embodiment of the present invention may be used to establish a data transmission link between the access node and another access node, so that a data transmission resource of the another access node may be used to assist the target node in performing data backhaul, thereby preventing the access node from affecting data transmission because of an inadequate backhaul capability of a default backhaul path.

Figure 7:
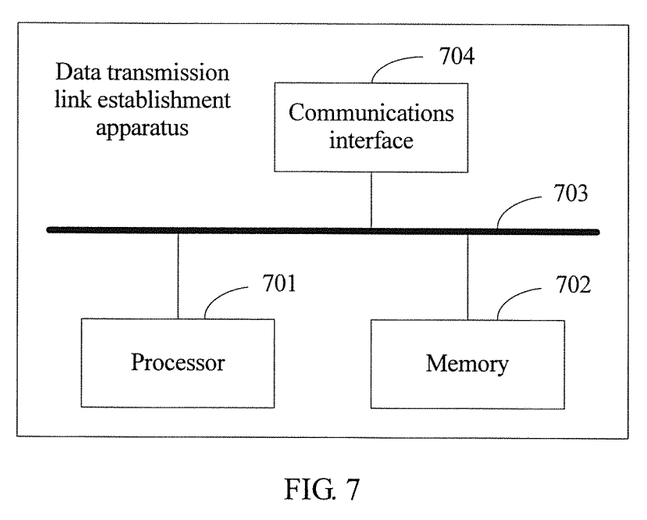
FIG. 7 is a schematic diagram of another embodiment of a data transmission link establishment apparatus according to the present invention.

Referring to FIG. 7, FIG. 7 is a schematic diagram of another embodiment of a data transmission link establishment apparatus according to the present invention. The apparatus may be disposed on a host node.

As shown in FIG. 7, the data transmission link establishment apparatus includes a processor 701, a memory 702, a communications interface 704, and another module, and various modules are connected by using a bus 703.

The bus 703 may be a Peripheral Component Interconnect (peripheral component interconnect, PCI for short) bus or an Extended Industry Standard Architecture (extended industry standard architecture, EISA for short) bus, or the like. The bus may be classified into an address bus, a data bus, a control bus, and the like. For convenience of indication, the bus is represented by using only one thick line in FIG. 7; however, it does not indicate that there is only one bus or only one type of buses.

The memory 702 is configured to store a program. Specifically, the program may include program code, and the program code includes a computer executable instruction. The memory 702 may include a random access memory (random access memory, RAM for short), and may further include a non-volatile memory (non-volatile memory), for example, at least one disk memory.

When the apparatus runs, the processor 701 executes the computer executable instruction stored in the memory 702, so that the apparatus executes the following method: selecting a target node; determining a backhaul node that needs to establish a data transmission link with the target node; setting protocol stack roles of the target node and the backhaul node in the data transmission link; and configuring the target node and the backhaul node according to the protocol stack roles to establish the data transmission link between the target node and the backhaul node.

Preferably, the processor 701 executes the computer executable instruction stored in the memory 702, so that in the method executed by the apparatus, the selecting a target node includes: detecting a data backhaul capability of each access node; and selecting an access node with an inadequate data backhaul capability as the target node.

Preferably, the processor 701 executes the computer executable instruction stored in the memory 702, so that in the method executed by the apparatus, the determining a backhaul node that needs to establish a data transmission link with the target node includes: selecting an access node as the backhaul node, where the access node has an idle data transmission resource and can establish a connection with the target node by using an air interface.

Preferably, the processor 701 executes the computer executable instruction stored in the memory 702, so that in the method executed by the apparatus, the setting protocol stack roles of the target node and the backhaul node in the data transmission link includes: determining a data transmission direction between the target node and the backhaul node; selecting a channel used for data transmission between the target node and the backhaul node; and determining the protocol stack roles of the target node and the backhaul node according to the data transmission direction and the channel.

Preferably, the processor 701 executes the computer executable instruction stored in the memory 702, so that in the method executed by the apparatus, the configuring the target node and the backhaul node according to the protocol stack roles includes: generating first configuration information and second configuration information, where the first configuration information is used to configure a protocol stack role of the backhaul node relative to the target node, and the second configuration information is used to configure a protocol stack role of the target node relative to the backhaul node; sending the first configuration information to the backhaul node; and sending the second configuration information to the target node.

Figure 8:
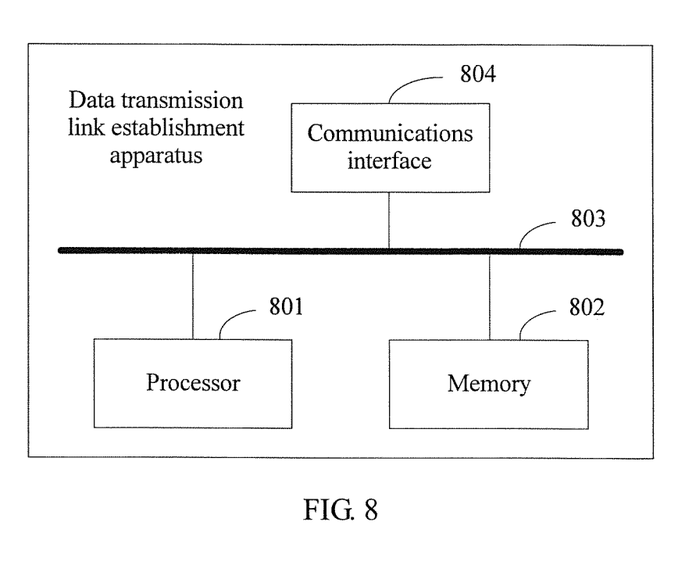
FIG. 8 is a schematic diagram of another embodiment of a data transmission link establishment apparatus according to the present invention.

Referring to FIG. 8, FIG. 8 is a schematic diagram of another embodiment of a data transmission link establishment apparatus according to the present invention. The apparatus may be disposed on a relay node.

As shown in FIG. 8, the data transmission link establishment apparatus includes a processor 801, a memory 802, a communications interface 804, and another module, and various modules are connected by using a bus 803.

The bus 803 may be a Peripheral Component Interconnect (peripheral component interconnect, PCI for short) bus or an Extended Industry Standard Architecture (extended industry standard architecture, EISA for short) bus, or the like. The bus may be classified into an address bus, a data bus, a control bus, and the like. For convenience of indication, the bus is represented by using only one thick line in FIG. 8; however, it does not indicate that there is only one bus or only one type of buses.

The memory 802 is configured to store a program. Specifically, the program may include program code, and the program code includes a computer executable instruction. The memory 802 may include a random access memory (random access memory, RAM for short), and may further include a non-volatile memory (non-volatile memory), for example, at least one disk memory.

When the apparatus runs, the processor 801 executes the computer executable instruction stored in the memory 802, so that the apparatus executes the following method: receiving configuration information sent by a host node; determining a protocol stack according to the configuration information; configuring, on the protocol stack, an access node as a protocol stack role specified by the configuration information.

In specific implementation, the present invention further provides a computer storage medium, where the computer storage medium may store a program, and, when the program is executed, a part or all of the steps of the embodiments of the calling method provided in the present invention may be performed. The storage medium may be a magnetic disk, an optical disc, a read-only memory (Read-Only Memory, ROM), a random access memory (Random Access Memory, RAM), or the like.

Persons skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, apparatus, server, and system embodiments are basically similar to a method embodiment, and therefore are described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A data transmission link establishment apparatus, comprising:
a processor, configured to:
select a target node;
determine a backhaul node for establishing a data transmission link with the target node;

determine a data transmission direction between the target node and the backhaul node;
select a channel for data transmission between the target node and the backhaul node;
determine protocol stack roles, in the data transmission link, of the target node and the backhaul node according to the data transmission direction and the channel, wherein the determined protocol stack role of the target node is one of an eNodeB (eNB) or a user equipment (UE) and the determined protocol stack role of the backhaul node is the other of the eNB or the UE; and
perform configuration on the target node and the backhaul node according to the protocol stack roles, for establishing the data transmission link between the target node and the backhaul node.

2. The apparatus according to claim 1, wherein the processor is further configured to:
detect a data backhaul capability between each access node and a host node; and
select, according to a detection result, an access node with an inadequate data backhaul capability as the target node.

3. The apparatus according to claim 1, wherein the processor is further configured to:
select an access node as the backhaul node, wherein the access node has an idle data transmission resource and can establish, by using an air interface, a connection with the target node.

4. The apparatus according to claim 2, wherein the processor is further configured to:
generate first configuration information and second configuration information, the first configuration information for configuring the protocol stack role of the backhaul node relative to the target node, and the second configuration information for configuring the protocol stack role of the target node relative to the backhaul node;
send the first configuration information to the backhaul node; and
send the second configuration information to the target node.

5. A data transmission link establishment method, comprising:
selecting a target node;
determining a backhaul node for establishing a data transmission link with the target node;
determining a data transmission direction between the target node and the backhaul node;
selecting a channel for data transmission between the target node and the backhaul node;
determining protocol stack roles, in the data transmission link, of the target node and the backhaul node according to the data transmission direction and the channel, wherein the determined protocol stack role of the target node is one of an eNodeB (eNB) or a user equipment (UE) and the determined protocol stack role of the backhaul node is the other of the eNB or the UE; and
configuring the target node and the backhaul node according to the protocol stack roles to establish the data transmission link between the target node and the backhaul node.

6. The method according to claim 5, wherein selecting a target node comprises:
detecting a data backhaul capability of each access node; and
selecting an access node with an inadequate data backhaul capability as the target node.

7. The method according to claim 5, wherein determining a backhaul node for establishing a data transmission link with the target node comprises:
selecting an access node as the backhaul node, wherein the access node has an idle data transmission resource and can establish a connection with the target node by using an air interface.

8. The method according to claim 7, wherein configuring the target node and the backhaul node according to the protocol stack roles comprises:
generating first configuration information and second configuration information, the first configuration information for configuring the protocol stack role of the backhaul node relative to the target node, and the second configuration information for configuring the protocol stack role of the target node relative to the backhaul node;
sending the first configuration information to the backhaul node; and
sending the second configuration information to the target node.

9. A communications system, comprising:
at least two access nodes; and
a host node, wherein the host node is configured to:
select a target node from the access nodes;
determine a backhaul node from the access nodes for establishing a data transmission link with the target node;
determine a data transmission direction between the target node and the backhaul node;
select a channel for data transmission between the target node and the backhaul node;
determine protocol stack roles, in the data transmission link, of the target node and the backhaul node according to the data transmission direction and the channel, wherein the determined protocol stack role of the target node is one of an eNodeB (eNB) or a user equipment (UE) and the determined protocol stack role of the backhaul node is the other of the eNB or the UE; and
configure the target node and the backhaul node according to the protocol stack roles to establish the data transmission link between the target node and the backhaul node.

10. The communications system according to claim 9, wherein the host node is further configured to:
detect a data backhaul capability between each access node and the host node; and
select, according to a detection result, an access node with an inadequate data backhaul capability as the target node.

11. The communications system according to claim 9, wherein the host node is further configured to:
select an access node as the backhaul node, wherein the access node has an idle data transmission resource and can establish, by using an air interface, a connection with the target node.

12. The communications system according to claim 10, wherein the host node is further configured to:
generate first configuration information and second configuration information, the first configuration information for configuring the protocol stack role of the backhaul node relative to the target node, and the second configuration information for configuring the protocol stack role of the target node relative to the backhaul node;
send the first configuration information to the backhaul node; and
send the second configuration information to the target node.

* * * * *